US005742416A

United States Patent [19]
Mizrahi

[11] Patent Number: 5,742,416
[45] Date of Patent: Apr. 21, 1998

[54] BIDIRECTIONAL WDM OPTICAL COMMUNICATION SYSTEMS WITH BIDIRECTIONAL OPTICAL AMPLIFIERS

[75] Inventor: Victor Mizrahi, Columbia, Md.

[73] Assignee: Ciena Corp., Linthicum, Md.

[21] Appl. No.: 623,356

[22] Filed: Mar. 28, 1996

[51] Int. Cl.⁶ .............................. H04J 14/02; H01S 3/00
[52] U.S. Cl. ..................... 359/134; 359/130; 359/160; 359/179; 359/341; 385/31; 385/37; 385/24
[58] Field of Search ....................... 359/114, 124, 359/130, 133–134, 143, 160, 173, 179, 341; 385/24, 31, 37, 42; 372/6

[56] References Cited

U.S. PATENT DOCUMENTS

| | | | |
|---|---|---|---|
| 5,283,686 | 2/1994 | Huber | 359/341 |
| 5,365,368 | 11/1994 | Hsu et al. | 359/134 |
| 5,384,651 | 1/1995 | Van de Voorde et al. | 359/124 |
| 5,563,733 | 10/1996 | Mitsuda et al. | 359/341 |
| 5,608,571 | 3/1997 | Epworth et al. | 359/341 |

*Primary Examiner*—Kinfe-Michael Negash
*Attorney, Agent, or Firm*—Margaret Burke

[57] ABSTRACT

The present invention provides a bidirectional WDM optical communication system with bidirectional optical amplifiers for optically amplifying two counter-propagating WDM optical signals. The bidirectional WDM optical communication system includes a first set of optical transmitters for creating a set of east-west optical channels and a second set of transmitters for creating a set of west-east optical channels. The respective channel sets are multiplexed by optical combiners and output to an optical transmission path. A bidirectional optical amplifier optically communicates with the optical transmission path for amplifying the east-west and west-east WDM signals. In an exemplary embodiment, the bidirectional optical amplifier comprises a first and second four-port optical circulators and a section of doped optical fiber with optical pumps interconnecting the two circulators. Bragg gratings configured to reflect either the west-east or the east-west channel band are positioned in two optical paths which optically communicate with both optical circulators. The amplifier is thus configured to optically amplify both counter-propagating WDM signals. The bidirectional WDM optical system further includes two demultiplexer systems for routing the individual optical channels to their respective receivers.

13 Claims, 4 Drawing Sheets

BIDIRECTIONAL WDM OPTICAL COMMUNICATION SYSTEMS WITH BIDIRECTIONAL OPTICAL AMPLIFIERS

BACKGROUND OF THE INVENTION

1. Field of the Invention

The present invention relates to bidirectional WDM optical communication systems and, more particularly, bidirectional WDM optical communication systems incorporating bidirectional optical amplifiers for simultaneously optically amplifying two WDM optical communication signals travelling in opposite directions over the same optical transmission path.

2. Description of the Related Art

Optical communication systems are a substantial and fast-growing constituent of communication networks. The expression "optical communication system," as used herein, relates to any system which uses optical signals to convey information across an optical waveguiding medium. Such optical systems include, but are not limited to, telecommunications systems, cable television systems, and local area networks (LANs). Optical systems are described in Gowar, Ed. *Optical Communication Systems*, (Prentice Hall, NY) c. 1993, the disclosure of which is incorporated herein by reference. Currently, the majority of optical communication systems are configured to carry an optical channel of a single wavelength over one or more optical waveguides. To convey information from plural sources, time-division multiplexing is frequently employed (TDM). In time-division multiplexing, a particular time slot is assigned to each information source, the complete signal being constructed from the signal portions created for each time slot. While this is a useful technique for carrying plural information sources on a single channel, its capacity is limited by fiber dispersion and fiber nonlinearities.

While the need for communication services increases, the current capacity of existing waveguiding media is limited. Although capacity may be expanded, e.g., by laying more fiber optic cables, the cost of such expansion is prohibitive. Consequently, there exists a need for a cost-effective way to increase the capacity of existing optical waveguides.

Wavelength division multiplexing (WDM) has been explored as an approach for increasing the capacity of fiber optic networks. A WDM system employs plural optical signal channels, each channel being assigned a particular channel wavelength. Since each channel can itself carry plural information sources via time division multiplexing, additional optical channels increase capacity over a single channel system in proportion to the number of channels. For example, a four-channel WDM optical system has 400% of the capacity of a conventional single channel system. In a WDM system, signal channels are generated, multiplexed, and transmitted over a waveguide. At the receiving end, the WDM optical signal is demultiplexed such that each channel wavelength is individually routed to a designated receiver. Through the use of optical amplifiers, such as doped fiber amplifiers, plural optical channels are directly amplified simultaneously, facilitating the use of WDM systems in long-distance optical systems.

In some optical system topologies, it may be advantageous to employ bidirectional optical transmission paths, e.g., a single optical waveguide carrying two counter-propagating optical signals. For such systems to be optically amplified, the optical amplifiers must be configured to amplify both of the counter-propagating optical signals. In U.S. Pat. No. 5,452,124, entitled "Unidirectional Amplification For Bidirectional Transmission Using Wavelength-Division Multiplexing," the disclosure of which is incorporated herein by reference, a single erbium-doped fiber amplifier is used to optically amplify two counter-propagating optical signals. A single four-port wavelength division multiplexer or, alternatively, a configuration of plural three-port wavelength division multiplexers are used to route the two optical signals in a single direction through the erbium-doped fiber amplifier. While this configuration is useful for bidirectional optical signals in which only a single optical channel is launched in each direction over an optical waveguide, there is no teaching or suggestion of bidirectional amplifiers useful for amplification of two counter-propagating WDM optical signals, each WDM optical signal comprised of plural optical signals of different wavelengths.

Due to the dichroic optical filters employed in the optical amplifiers of the '124 patent, the disclosed configurations are disadvantageous for use in bidirectional WDM systems, particularly in dense bidirectional WDM optical systems in which the optical channel spacing is approximately one nanometer or less. Because the multilayer interference filters of the '124 do not exhibit spectrally sharp transmission profiles, a guard band (in which no optical channel can be positioned) is required to prevent cross-talk between counter-propagating optical channels. This guard band can be on the order of several nanometers wide, reducing the potential capacity of a WDM system by several channels.

Accordingly, there is a need in the art for improved bidirectional amplifiers for use in optical communication systems. In particular, there is a need in the art for bidirectional optical amplifiers configured for amplification of counter-propagating wavelength division multiplexed optical communication signals.

SUMMARY OF THE INVENTION

The present invention provides a bidirectional wavelength division multiplexed optical communication system with bidirectional optical amplifiers for optically amplifying two counter-propagating wavelength division multiplexed optical signals. The bidirectional wavelength division multiplexed optical communication system includes a first set of optical transmitters for transmitting a set of west-east optical signals. A first optical combiner is provided with inputs for communicating with each of the west-east optical transmitters and an output for outputting a west-east WDM optical communication signal comprised of the west-east optical communication signals. An optical transmission path optically communicates with the output port of the first optical combiner for receiving the west-east WDM optical communication signal. The expression "optically communicates" as used herein, refers to any connection, coupling, link, or the like, by which optical signals carded by one optical system element are imparted to the "communicating" element. Such "optically communicating" devices are not necessarily directly connected to one another, but may be separated by intermediate optical components or devices.

The bidirectional WDM optical system includes a second set of optical transmitters for transmitting a plurality of optical communication signals in an east-west, direction. A second optical combiner is provided having inputs for communicating with each of the east-west optical transmitters and an output for outputting an east-west WDM optical communication signal comprised of the plurality of east-west optical communication signals. The output of the second optical combiner optically communicates with an east access point of the optical transmission path.

A bidirectional optical amplifier optically communicates with the optical transmission path for optically amplifying the west-east and east-west WDM optical communication signals. The bidirectional amplifier includes a first optical circulator having first, second, third, and fourth circulator ports. The first port of the first optical circulator receives the west-east WDM optical communication signal from the transmission path. The bidirectional amplifier further includes a second optical circulator having first, second, third, and fourth circulator ports. The first port of the second optical circulator receives the east-west WDM optical communication signal from the transmission path. A first Bragg grating or set of Bragg gratings configured to reflect optical wavelengths within the spectral region of the west-east WDM optical communication signal optically communicates with the second port of the first optical circulator. Similarly, a second Bragg grating or set of Bragg gratings configured to reflect optical wavelengths within the spectral region of the east-west WDM optical communication signal optically communicates with the second port of the second optical circulator.

A first gain block, typically selected from rare-earth doped fiber amplifiers, semiconductor amplifiers, Raman amplifiers and the like, optically communicating with the third port of the first optical circulator and with the fourth port of the second optical circulator. A second gain block optically communicates with the third port of the second optical circulator and with the fourth port of the first optical circulator.

The bidirectional WDM optical communication system further includes first and second receiving systems optically communicating with the optical transmission path for respectively receiving the west-east and east-west wavelength division multiplexed optical communication signals.

DETAILED DESCRIPTION

Figure 1:
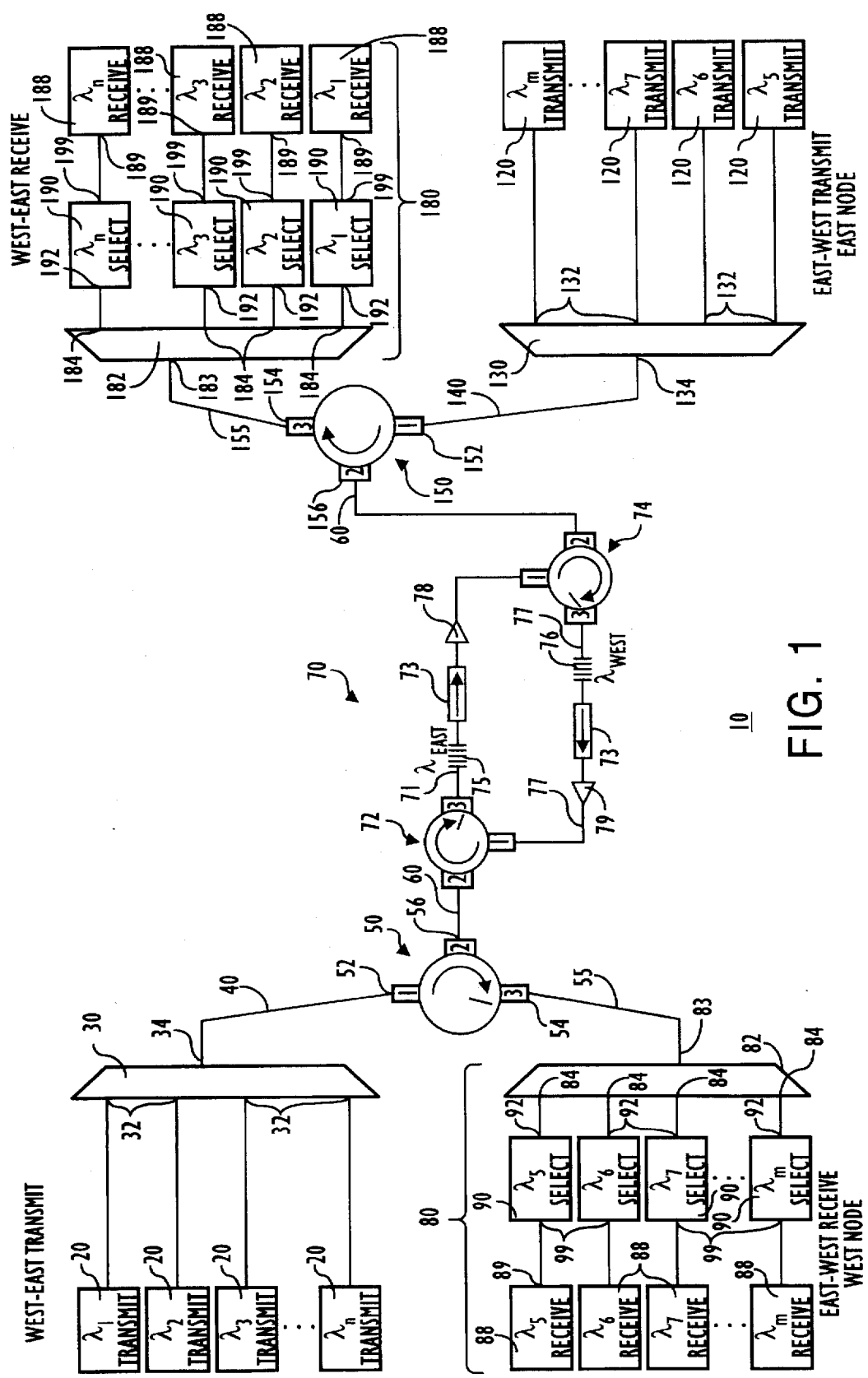
FIG. 1 schematically depicts a bidirectional WDM optical communication system with a bidirectional optical amplifier according to one embodiment of the present invention.

Turning to the drawings in detail in which like numerals indicate the same or similar elements in each of the figures, FIG. 1 depicts a bidirectional optical communication system 10 according to the present invention. Wavelength division multiplexed optical communication system 10 includes a plurality of west-east optical transmitters 20 and a plurality of east-west optical transmitters 120. The terms "west-east" and "east-west," as used herein, denote opposite transmission directions in an optical communication system, regardless of the actual geographic direction in which the signals are travelling. Accordingly, optical transmitters launching "east-west" optical signals are positioned at an opposing side of an optical transmission path to optical transmitters launching "west-east" optical signals. Conventionally, the transmission node on the left side of FIG. 1 is designated the "west" node, while the transmission node on the right side of FIG. 1 is designated the "east" node.

Each optical transmitter 20 and each optical transmitter 120 emits an information-bearing optical signal at an optical channel wavelength. The expression "information bearing optical signal," as used herein, refers to an optical signal which has been coded with information, including, but not limited to, audio signals, video signals, and computer data. As depicted in FIG. 1, optical transmitters 20 deliver wavelengths $\lambda_1 \lambda_2 \lambda_3$ through $\lambda_n$ corresponding to optical channels 1, 2, 3 through n while optical transmitters 120 deliver wavelengths $\lambda_5 \lambda_6 \lambda_7$ through $\lambda_m$ corresponding to optical channels 5, 6, 7 through m. It is understood that the bidirectional wavelength division multiplexed optical systems of the present invention use a variety of a channel plans and are not limited by the eight-channel bidirectional system depicted in FIG. 1. Typically, the smallest number of optical channels in a bidirectional WDM optical system is four, with two channels launched in the west-east direction and two channels launched in the east-west direction. It is further understood that the letters "m" and "n" designate the largest channel number in each direction and are any whole number, particularly, m is a whole number with a value of two or larger and n is a whole number with a value of four or larger.

The optical channel wavelengths emitted by the transmitters are located within the gain spectrum of the optical amplifiers employed in the bidirectional system. In an exemplary dense bidirectional WDM embodiment, the west-east optical channel wavelengths emitted by transmitters 20 occupy a contiguous spectral region at the lower wavelength end of the amplifier gain spectrum. The east-west optical channels emitted by transmitters 120 occupy a contiguous spectral region at the upper wavelength region of the amplifier gain spectrum. When rare-earth doped fibers are used as the gain medium of the amplifiers, the system spectrum is typically within a range of approximately 1530 nm to 1560 nm, with the west-east spectral portion occupying 1530–1545 nm and the east-west spectral portion occupying 1546–1560 nm. However, it is understood that the system spectrum within which the optical transmitter wavelengths are located can correspond to the gain spectrum of any optical amplifiers. Consequently, when using amplifiers with a gain spectrum in a different region, the optical transmitters output wavelengths within that gain spectrum. Additionally, the optical channel wavelengths are selected to correspond to demultiplexer wavelength selector wavelengths in the optical receiving system.

Each optical transmitter 20, 120 generally includes a laser, such as a DFB semiconductor laser, a laser controller, and a modulator for creation of the information-bearing optical signal. In an exemplary embodiment, the transmitter laser is a DFB semiconductor diode laser, generally comprising one or more III–V semiconductor materials, commercially available from a wide variety of suppliers such as Fujitsu, GEC Marconi, Spectra Diode Labs, Alcatel, and Hewlett-Packard. The laser outputs an optical carrier signal at a particular channel wavelength corresponding to a demultiplexer wavelength included in a receiving system. The laser controller provides the required laser bias current as well as thermal control of the laser. Using thermal control, typically responsive to feedback information from an appropriate wavelength reference, the precise operating wavelength of the laser is maintained, typically to less than a angstrom bandwidth. Exemplary techniques for maintaining the precise operating wavelength of a laser are described in co-pending, commonly-assigned U.S. patent application Ser. No. 08/605,856 the disclosure of which is incorporated by reference herein.

The optical transmitters each include a modulator for imparting information to the optical carrier signal. An exemplary modulator is an external modulator, such as a Mach-Zehnder modulator, employing a waveguiding medium whose refractive index changes according to the applied electrical field, i.e., a material exhibiting an electro-optic effect. In the Mach-Zehnder configuration, two optical interferometer paths are provided. An incoming optical carrier is split between the two optical paths. At least one path of the interferometer is phase modulated. When the signal is recombined at the output, the light from the paths either constructively or destructively interferes, depending upon the electrical field applied to the surrounding electrodes during the travel time of the carrier, creating an amplitude-modulated output optical signal.

When optical transmitters 20 and 120 form part of an existing optical system, a plurality of remodulators can be employed. Such remodulators operate to map a space division optical communication system, i.e., a system in which individual optical signals are physically separated in space by transmission on separate waveguides, onto a wavelength division optical communication system, i.e., a communication system in which individual optical signals are simultaneously transmitted in the same waveguide by receiving an information-bearing optical signal at an input and outputting an optical channel having a carrier wavelength corresponding to a demultiplexer wavelength in a WDM optical system. The use of optical remodulators ensures compatibility of optical communication system 10 with currently-deployed transmission equipment. Further description of wavelength division multiplexed optical communication systems with remodulators is found in co-pending U.S. patent application Ser. No. 08/438,844, filed May 11, 1995, now U.S. Pat. No. 5,504,609, the disclosure of which is incorporated by reference herein.

The optical channels output from transmitters 20 are brought together in optical combiner 30 from input ports 32 for conveyance to output optical waveguide 40 through output port 34. Similarly the optical channels output from transmitters 120 are brought together in optical combiner 130 from input ports 132 for conveyance to output optical waveguide 140 through output port 134. Optical combiners 30, 130 are selected from any passive optical component which can combine plural wavelengths into a single output medium. Frequently, optical splitters used to divide a signal among plural outputs are used as optical combiners, operated in reverse fashion from the splitter. Exemplary optical combiners include 1×N wideband single mode splitters available from IOT Integrierte Optik GmbH, Waghausel-Kirrlach, Germany, and fused fiber combiners available from Gould, Inc., Millersville, Md.

The combination of channels output by transmitters 20 forms a west-east wavelength division multiplexed optical signal which is input to directional optical coupler 50 through coupler input port 52. Similarly, the combination of channels output by transmitters 120 forms an east-west wavelength division multiplexed optical signal which is input to directional optical coupler 150 through coupler input port 152. Couplers 50, 150 are typically three-port optical circulators, as depicted in FIG. 1. In the three-port optical circulator, optical signals which enter circulator port 1 are output to circulator port 2, while optical signals which enter circulator port 2 are output to circulator port 3. In this manner, optical signals are rotated through the optical circulator in the illustrated circulating direction. Exemplary optical circulators include those commercially available from JDS-Fitel, Canada, and E-Tek, San Jose, Calif.

Using this circulator configuration, the west-east WDM optical signal enters coupler 50 through port 52, exiting through port 56 onto transmission waveguide 60 while the east-west WDM optical signal enters coupler 50 through port 56 and exits through port 54 toward the east-west receive system 80. Similarly, the east-west WDM optical signal enters coupler 150 through port 152 and exits through port 156 onto waveguide 60 while the west-east WDM optical signal enters coupler 150 through port 156 and exits through port 154 toward the west-east receive system 180.

Optical waveguide 60 is typically a single-mode optical fiber such as SMF-28, available from Corning, or TRUEWAVE, available from AT&T Corp./Lucent Technologies, and is the principal transmission medium for the optical communication system. However, any optical waveguide which is capable of transporting multiple optical wavelengths can be employed as waveguide 60 in optical system 10.

Interposed along waveguide 60 is one or more bidirectional optical amplifier 70. While not shown in FIG. 1, it is understood that plural bidirectional optical amplifiers 70 can be positioned along optical transmission path 60. Typically, when WDM optical communication system 10 is used as a long-haul interexchange carrier route, transmission path 60 is on the order of hundreds of kilometers long with optical amplifiers positioned on the order of every 100 km, with a range of 30 to 130 km being exemplary, depending upon the number of optical channels to be amplified. Bidirectional amplifiers 70 can also be used as pre- and post-amplifiers in the optical communication system.

Interposed along waveguide 60 is one or more bidirectional optical amplifier 70. Amplifier 70 comprises first and second directional optical couplers 72, 74, grating reflectors 75 and 76 and gain blocks 78 and 79. Directional couplers 72 and 74 generally comprise the depicted three-port optical circulators. In the illustrated three-port optical circulators, optical signals input to the first circulator port exit at the second circulator port while optical signals input to the second circulator port exit at the third circulator port. The depicted circulators are not required to be fully circulating, i.e., signals input to circulator port 3 would not be output to port 1. However, fully circulating optical circulators may also be used in the bidirectional amplifiers of the present invention.

In bidirectional amplifier 70, ports 2 of optical circulators 72 and 74 optically communicate with transmission path 60. Port 2 of optical circulator 72 receives the west-east WDM optical signal from transmission path 60 while port 2 of optical circulator 74 receives the east-west WDM optical signal from transmission path 60. These signals are rotated to ports 3 of their respective circulators. Optical path 71 communicates with port 3 of circulator 72. Gain block 78 is positioned in optical path 78 for optically amplifying the west-east optical signal received from port 1 of circulator 72. Gain block 78 is selected from any component or device capable of providing optical gain to the incident optical signals. Optical path 71 terminates at port 1 of circulator 74. Similarly, optical path 77 communicates with port 3 of circulator 74 with gain block 79 positioned therein for optically amplifying the east-west optical signal received from port 2 of circulator 74. As with gain block 78, gain block 79 is selected from any component or device capable of providing optical gain to the incident optical signals.

To prevent Rayleigh scattered optical signals or reflections, e.g., reflections from connectors, from the counter-propagating optical signals from entering the gain blocks, grating reflector 75 is positioned in optical path 71 and grating reflector 76 is positioned in optical path 77. Preferably, Bragg gratings 75 and 76 comprise a series of photoinduced refractive index perturbations in an optical fiber which reflect optical signals within a selected wavelength band. Bragg gratings suitable for use in the optical system of the present invention are described in Morey et al., "Photoinduced Bragg Gratings in Optical Fibers," *Optics and Photonics News*, February 1994, pp. 8–14, the disclosure of which is incorporated by reference herein. Although the above-described in-fiber Bragg gratings are exemplary, it is understood that other types of Bragg gratings can be employed, including, but not limited to, bulk gratings, e.g., photoinduced refractive index perturbations in bulk optical media. Thus, as used herein, the term "Bragg gratings" encompasses in-fiber, waveguide, and bulk versions of these optical components.

Bragg grating 75 is one or more Bragg gratings configured to reflect wavelengths within the east-west spectral band. The east-west signals scattered from transmission path 60 onto optical path 71 are reflected by grating 75 back towards circulator 72 and are attenuated within the circulator. Similarly, Bragg grating. 76 is one or more Bragg gratings configured to reflect wavelengths within the west-east spectral band. The west-east signals scattered from transmission path 60 onto optical path 77 are reflected by grating 75 back towards circulator 74 and are attenuated within the circulator. In this manner, gain blocks 78 and 79 do not amplify the scattered optical signals, minimizing the noise in the amplified communication signals and avoiding the possibility of creating lasing action in the device.

In the amplifier configuration of FIG. 1, there is the potential for one or more optical signals to be transmitted through the radiation mode loss region of at least one grating. As is known in the art, strong fiber gratings, i.e., gratings which reflect over 95% of the incident design wavelength, generally include a significant radiation mode loss band on the short wavelength side of the transmission spectrum. See, for example, U.S. Pat. Nos. 5,457,760 and 5,475,780 to Mizrahi, the disclosures of which are incorporated by reference herein. The expression "radiation mode loss" describes any optical signal loss due to scattering outside the core of the waveguide, including radiation scattered in the cladding of the waveguide, and is caused by the grating presence within the core, and not the cladding, of the optical waveguide. Consequently, if optical signals are to pass through the radiation mode loss region of an optical grating, it is desirable to minimize the radiation mode loss to avoid substantial signal attenuation. Techniques for minimizing radiation mode loss regions in fiber gratings are described in the '760 patent, incorporated by reference above, and Mizrahi and Sipe *J. of Lightwave Tech.*, Vol. 11 (October, 1993) pp. 1513–1517, the disclosure of which is incorporated by reference herein. Further techniques for minimizing radiation mode loss are described in Delavaque et al., *OFC '95 Postdeadline Papers*, pp. PD5-2–PD5-5, the disclosure of which is incorporated by reference herein.

Optionally, isolators 73 can be positioned, in optical paths 71 and 77. Isolators 73 prevent backward amplified spontaneous emission (ASE) from being reflected forward by the grating and re-entering the gain blocks, de-stabilizing the amplifier. Alternatively, if isolation is desired, isolators are included as part of gain blocks 78 and 79.

As stated previously, gain blocks 78 and 79 are selected from any component or device which produces optical gain to incident optical signals. Typically, gain blocks 78 and 79 are selected from doped fiber amplifiers, semiconductor amplifiers, and Raman amplifiers. In an exemplary embodiment, gain blocks 78 and 79 are rare-earth doped fiber amplifiers having the configuration shown in FIG. 2. The gain block includes a length of doped optical waveguide 161 with the dopant selected from materials which can produce laser action in the waveguide. Such materials include rare earth dopants such as erbium, neodymium, praseodymium, ytterbium, or mixtures thereof. Pumping of the doped waveguide at a specific pump wavelength causes population inversion among the electron energy levels of the dopant, producing optical amplification of the wavelength division multiplexed optical signals. For doped fibers employing erbium as the dopant, a wavelength band between approximately 1530 nm and approximately 1555 nm is the useful gain region for incident optical signals when the doped fiber is pumped. Erbium-doped fiber 161 is commercially available from Alcatel, Corning, Inc., AT&T Corp./Lucent Technologies, and Sumitomo Corp.

Figure 2:
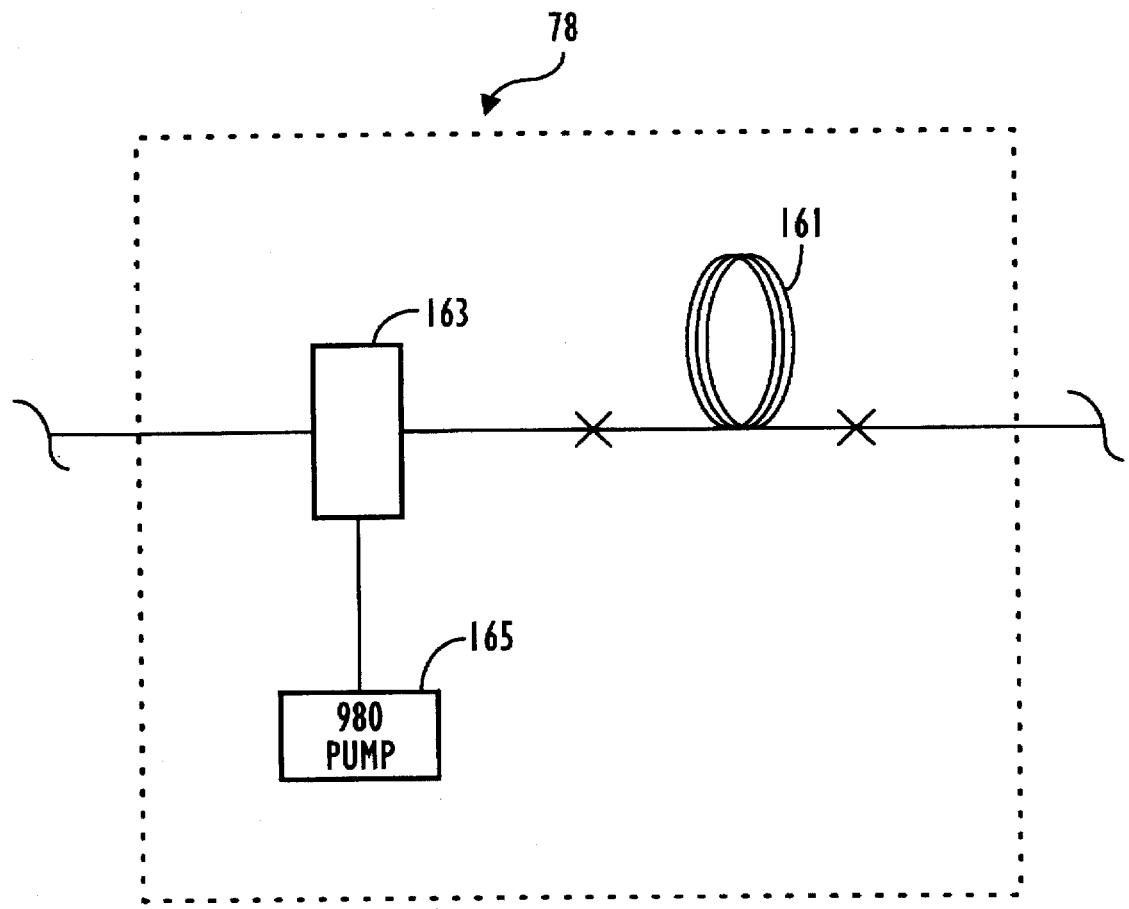
FIG. 2 schematically depicts a gain block configuration useful in the bidirectional optical amplifiers of the present invention.

In the gain block of FIG. 2, pump connection elements 163 is provided to connect the erbium fiber with a source of optical pumping energy. Pump connection element 163 is typically a wavelength selective multiplexer which permit pump radiation to enter the doped fiber section without allowing transmission channel radiation to pass into the pump. A 980 nm laser 165 is used to pump doped fiber 161. It is understood that the single stage gain block configuration of FIG. 2 is exemplary; other configurations (single stage and multiple stage) which can be employed as gain blocks 78 and 79 are disclosed in U.S. patent application Ser. Nos. 08/457,292 now U.S. Pat. No. 5,532,864 and 08/554,976, assigned to the instant assignee, the disclosures of which is incorporated by reference herein. Additional amplifiers and rare-earth doped fiber amplifier configurations useful for gain blocks 78 and 79 are disclosed in Bjarklev, *Optical Fiber Amplifiers: Design and System Applications*, (Artech House, Norwood, Mass.), c. 1993, the disclosure of which is incorporated herein by reference., and Gowar, *Optical Communication Systems*, incorporated by reference above.

In operation, the west-east WDM optical signal (the "west" signal) enters port 1 of circulator 72. As the west WDM signal exits circulator 72 through port 2, it is placed on optical path 71 where it is transmitted through grating 75 and is optically amplified as it traverses gain block 78. The amplified west WDM signal enters the second optical circulator 74 through port 1 and is output through port 2 where it continues propagation along optical transmission path 60 towards west-east receiving system 180.

The east-west WDM optical signal (the "east" signal) enters circulator 74 from optical transmission path 60 through circulator port 2. The east-west WDM signal exits through port 3 and is placed on optical path 77 where it is transmitted through grating 76 and is optically amplified as it traverses gain block 79. Following amplification, the east optical signal enters optical circulator 72 through port 1, exiting through port 2 onto optical transmission path 60 to continue propagation toward east-west receiving system 80.

Following transmission and amplification, the west-east WDM optical signal enters coupler 150 through port 156, exiting onto output path 155 through output port 154. Similarly, the east-west WDM optical signal enters coupler 50 through port 56, exiting onto output path 55. Following output of the WDM optical signals by couplers 50, 150, each channel must be demultiplexed and routed to the receiver designated for the particular channel through receiving systems 80 and 180. It is understood that the depicted receiving systems are exemplary; any device, component, or system which can receive a multiplexed optical signal and separate and route individual optical channels towards designated receivers can be selected as receiving system 80, 180. Such devices/systems include, but are not limited to demultiplexers based on waveguide routers, commercially available from AT&T/Lucent Technologies, Fabry-Perot wavelength selectors, interference filters, and gratings-based transmission filters such as those depicted in U.S. Pat. Nos. 5,457,760 and 5,475,780, the disclosures of which are incorporated by reference herein.

The multiplexed signals are input to optical splitters 82, 182 respectively through input ports 83, 183. The optical splitters place a portion of the multiplexed signals onto each of plural output paths 84, 184. Each output path 84, 184 optically communicates with a demultiplexer wavelength selector system 90, 190. Optical splitters 82, 182 are selected from optical devices which can divide an input optical signal and place it onto plural output paths. Exemplary splitters include passive optical components such as those components described for use as optical combiners 30, 130.

Figure 3:
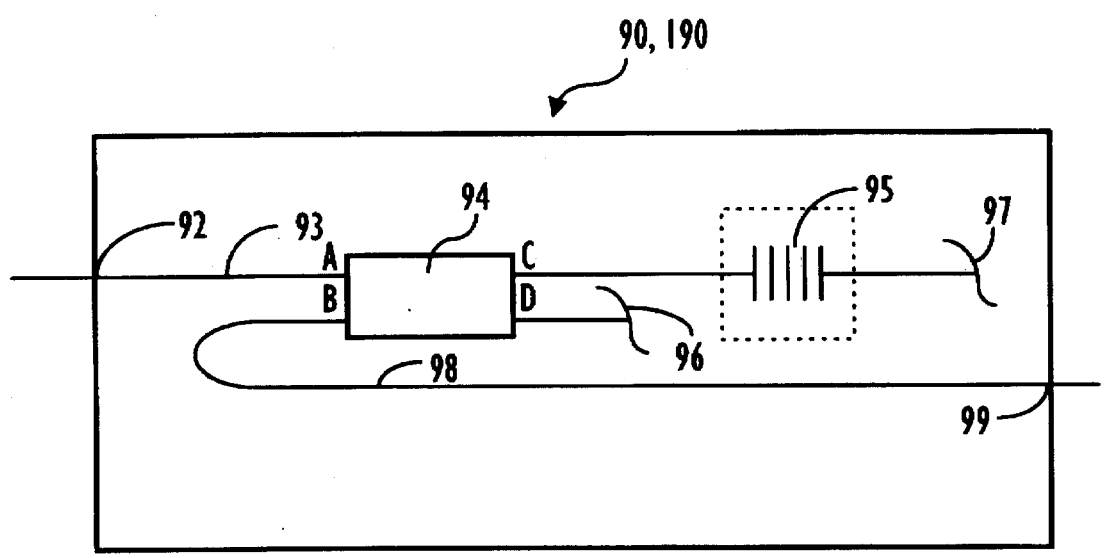
FIG. 3 schematically depicts a wavelength selector for use in the bidirectional WDM optical communication system of FIG. 1.

Turning to FIG. 3, a detailed schematic representation of wavelength selectors 90, 192 is depicted. While the wavelength selector elements are depicted with reference numerals directed only to wavelength selectors 90, it is understood that substantially similar components are found in wavelength selector 190. The output portions of the WDM optical signals from splitters 82, 182 enter each of wavelength selectors 90, 190 through input ports 92, 192 and are placed onto optical path 93. Optical path 93, typically an optical fiber, passes the WDM signal into coupler 94. Coupler 94 is typically a 3 dB fused fiber coupler. The WDM optical signal entering coupler 94 through port A is equally divided between output ports C and D. The portion of the optical signal exiting the coupler through port D passes through low reflectivity port 96 and exits the optical system. The low reflectivity port 96 is typically an angled fiber cut or an attenuating termination device, commercially available from Gould, although any low reflectivity waveguide termination technique may be employed. Optionally, a detector is positioned to receive the signals which pass through port D to monitor system functions.

The portion of the WDM optical signal which exits coupler 94 through port C encounters optical filter 95. The optical filter passes optical signals having wavelengths other than the channel wavelength to be sent to the optical channel receiver. These non-selected channels pass through low reflectivity port 97 and exit the optical communication system. The channel wavelength is reflected by optical filter 95 to be routed towards the optical receiver back through coupler 94, exiting onto optical path 98 through coupler port B. In an exemplary embodiment, optical filter 95 is a Bragg grating configured to reflect a particular optical channel. Although the above-described in-fiber Bragg gratings are exemplary optical filters, it is understood that other types of Bragg gratings can be employed as optical filter 95, including, but not limited to, bulk gratings, e.g., photoinduced refractive index perturbations in bulk optical media. Thus, as used herein, the term "Bragg gratings" encompasses in-fiber, waveguide, and bulk versions of these optical components. Since each wavelength selector 90, 192 selects a designated optical channel to be routed to the respective optical receiver, each Bragg grating reflects a different optical channel. The selected optical channels exit wavelength selectors 90, 190 through selector output ports 99, 199.

Following selection by the wavelength selectors, the channel wavelengths are input to their respective optical receivers 88, 188 through receiver inputs 89, 189. Optionally, the signal may be optically amplified before it reaches the receiver. The optical receiver generally detects the optical signal and converts it to an electrical signal, typically through the use of a photodiode device. Various optical receivers suitable for use in optical system 10 are described in Gowar, *Optical Communication Systems*, discussed above. In optical communication system 10, the receiver will frequently be part of an existing optical communication system to which the reception channel wavelength is routed. Consequently, the optical system 10 can function with numerous types of receivers to ensure compatibility with existing optical equipment.

Figure 4:
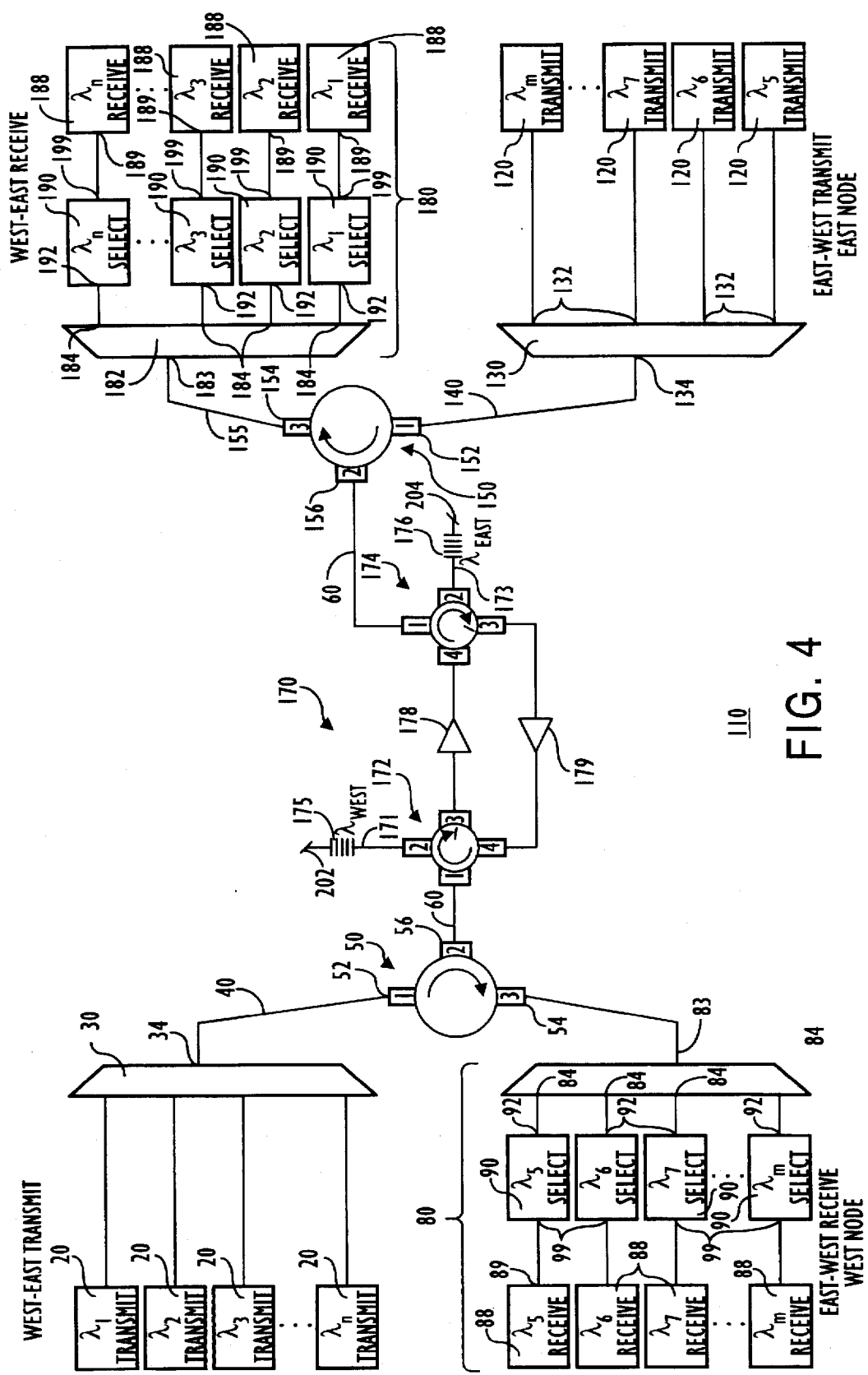
FIG. 4 schematically depicts a bidirectional WDM optical communication system with a bidirectional optical amplifier according to a further embodiment of the present invention.

FIG. 4 depicts a further embodiment of a bidirectional optical communication system according to the present invention. The bidirectional communication system of FIG. 4 is substantially similar to the bidirectional optical communication system of FIG. 1 with the exception of bidirectional optical amplifier 170. Amplifier 170 comprises first and second directional optical couplers 172, 174, grating reflectors 175 and 176 and gain blocks 178 and 179. Directional optical couplers 172 and 174 generally comprise the depicted four-port optical circulators. Advantageously, the bidirectional amplifier configuration of FIG. 4 avoids the transmission of optical signals through the radiation mode loss region of the gratings.

In the depicted bidirectional amplifier 170, port 1 of optical circulaters 172 and 174 communicates with transmission path 60. Port 1 of optical circulater 172 receives the west-east WDM optical signal from transmission path 60 while port 1 of optical circulater 174 receives the east-west WDM optical signal from transmission path 60.

An optical path 171 optically communicates with port 2 of circulater 172 for receiving the west-east WDM optical signal originating from circulater port 1. Interposed along optical path 171 is Bragg grating 175. Preferably, Bragg grating 176 comprises a series of photoinduced refractive index perturbations in an optical fiber which reflect optical signals within a selected wavelength band. Bragg gratings suitable for use in the optical system of the present invention are described above.

Bragg grating 175 reflects optical signals in the west-east spectral band. In an exemplary embodiment, a single grating is used to reflect the entire west-east spectral region. Alternatively, a series of Bragg gratings, each of which is configured to reflect a single optical channel wavelength is positioned in optical path 171. When a series of gratings are employed, the gratings are ordered such that the shortest channel wavelength is reflected first, in order up to the longest channel wavelength, to eliminate radiation mode loss effects, as described above.

In an exemplary embodiment when a broad grating is used as grating 175, the grating is chirped. Advantageously, the grating is chirped is such a manner as to reflect the wavelengths in sequential order from shortest to longest wavelengths. Methods of fabricating chirped gratings are disclosed in Farries et al. *Electronics Letters*, Vol. 30, No. 11, 29 May 1995, pp. 891–892, the disclosure of which is incorporated by reference herein. When plural Bragg gratings are employed, the individual Bragg gratings can also be chirped gratings.

Similarly, an optical path 173 optically communicates with port 2 of circulater 174 for receiving the east-west WDM optical signal input at port 1. In-fiber Bragg grating 176, configured to reflect the west-east spectral band, is positioned in optical path 173. As with Bragg grating 175, a single Bragg grating may be used to reflect the entire east-west spectral band or a series of Bragg gratings may be used to reflect the west-east spectral band. Low reflectivity terminations 202 and 204 are used for optical signals exiting the system (e.g., ASE). Alternatively, an optical detector can be positioned at locations 202 and 204 for system monitoring purposes. In a further embodiment, optical service channel transmitters and/or receivers can be positioned at points 202 and 204 in bidirectional amplifier 170.

Interconnecting the third port of circulator 172 and the fourth port of circulator 174 is gain block 178. Interconnecting the third port of circulator 174 and the fourth port of circulator 172 is gain block 179. Gain blocks 178 and 179 are selected to have the configuration depicted in FIG. 2 or any of the configurations described above as suitable for gain blocks 78 and 79 of FIG. 1.

In operation, the west-east WDM optical signal (the "west" signal) enters port 1 of circulator 172. As the west WDM signal exits circulator. 172 through port 2, it is placed on optical path 171 where it encounters grating 175 and is reflected back toward circulator port 2. At this point, any amplified spontaneous emission (ASE) associated with the west-east WDM signal exits the optical signal following transmission through grating 175. The west signal re-enters circulator 172 through port 2 and is output through port 3. The west WDM signal is optically amplified as it traverses gain block 178. The amplified west WDM signal enters the second optical circulator 174 through port 4 and is output through port 4 where it continues propagation along optical transmission path 60 towards west-east receive system 180.

The east-west WDM optical signal (the "east" signal) enters circulator 174 from optical transmission path 60 through circulator port 1. The east-west WDM signal exits through port 2 and traverses optical path 173 where it encounters grating 176 and is reflected back toward circulator port 2, while ASE is transmitted through the grating. The east WDM signal re-enters through port 2 and is circulated through to port 3. The east WDM signal is optically amplified as it traverses gain block. Following amplification, the east optical signal enters optical circulator 172 through port 4, exiting through port 1 onto optical transmission path 60 to continue propagation toward east-west receive system 80.

Advantageously, the bidirectional WDM optical communication systems with bidirectional amplifiers 70, and 170 provide a reliable technique for optical amplification of bidirectional WDM optical signals with a low probability of crosstalk between counter-propagating signals. The gain blocks of the bidirectional amplifiers can be optimized for gain equalization within the specific wavelength band to be amplified by that gain block. Techniques for gain equalization are discussed in co-pending, commonly-assigned U.S. patent application Ser. No. 08/554,976, the disclosure of which is incorporated by reference herein. Loss elements positioned within the optical path can be used for coarse amplifier gain equalization.

While the foregoing invention has been described in terms of the embodiments discussed above, numerous variations are possible. Accordingly, modifications and changes such as those suggested above, but not limited thereto, are considered to be within the scope of following claims.

What is claimed is:

1. A bi-directional wavelength division multiplexed optical communication system, comprising:

a first plurality of optical transmitters for transmitting a plurality of optical communication signals in a first, nominally west-east, direction;

a first optical combiner having inputs for communicating with each of the west-east optical transmitters and an output for outputting a west-east wavelength division multiplexed optical communication signal comprised of the plurality of west-east optical communication signals;

an optical transmission path including nominally west and east access ports having a west access port optically communicating with the output port of the first optical combiner for receiving the west-east wavelength division multiplexed optical communication signal;

a second plurality of optical transmitters for transmitting a plurality of optical communication signals in a second, nominally east-west, direction;

a second optical combiner having inputs for communicating with each of the east-west optical transmitters and an output for outputting an east-west wavelength division multiplexed optical communication signal comprised of the plurality of east-west optical communication signals, the output of the second optical combiner optically communicating with the east access port of the optical transmission path;

a bi-directional optical amplifier optically communicating with the optical transmission path for optically amplifying the west-east wavelength division multiplexed optical communication signal and for optically amplifying the east-west wavelength division multiplexed optical communication signal, the bi-directional optical amplifier comprising:

a first circulator having first, second and third circulator ports, the second port of the first optical circulator optically communicating with the optical transmission path to receive the west-east wavelength division multiplexed optical communication signal;

a second circulator having first, second and third circulator ports, the second port of the second optical circulator optically communicating with the optical transmission path to receive the east-west wavelength division multiplexed optical communication signal;

a first optical path optically communicating with the third port of the first optical circulator and with the first port of the second optical circulator, the first optical path having positioned therein a first set of one or more Bragg gratings configured to reflect optical wavelengths within a first spectral region which includes the east-west wavelength division multiplexed optical communication signal and further having positioned therein a first gain block for optically amplifying the west-east wavelength division multiplexed optical signal; and a second optical path optically communicating with the third port of the second optical circulator and with the first port of the first optical circulator, the second optical path having positioned therein a second set of one or more Bragg gratings configured to reflect optical wavelengths within a second spectral region which includes the west-east wavelength division multiplexed optical communication signal and further having positioned therein a second gain block for optically amplifying the east-west wavelength division multiplexed optical signal; and first and second receiving systems optically communicating with the optical transmission path for respectively receiving the west-east and east-west wavelength division multiplexed optical communication signals.

2. A bidirectional wavelength division multiplexed optical communication system as recited in claim 1 wherein the first and second gain blocks comprise optically-pumped rare-earth-doped optical fibers.

3. A bidirectional wavelength division multiplexed optical communication system as recited in claim 2 wherein the rare-earth doped optical fibers include erbium.

4. A bidirectional wavelength division multiplexed optical communication system as recited in claim 1 wherein the first and second receiving systems include wavelength selectors comprising one or more Bragg gratings for selecting individual optical channels.

5. A bidirectional wavelength division multiplexed optical communication system comprising:

a first plurality of optical transmitters for transmitting a plurality of optical communication signals in a first, nominally west-east, direction;

a first optical combiner having inputs for communicating with each of the west-east optical transmitters and an output for outputting a west-east wavelength division multiplexed optical communication signal comprised of the plurality of west-east optical communication signals;

an optical transmission path including nominally west and east access ports having a west access port optically communicating with the output port of the first optical combiner for receiving the west-east wavelength division multiplexed optical communication signal;

a second plurality of optical transmitters for transmitting a plurality of optical communication signals in a second, nominally east-west, direction;

a second optical combiner having inputs for communicating with each of the east-west optical transmitters and an output for outputting an east-west wavelength division multiplexed optical communication signal comprised of the plurality of east-west optical communication signals, the output of the second optical combiner optically communicating with an east access port of the optical transmission path;

a bidirectional optical amplifier optically communicating with the optical transmission path for optically amplifying the west-east wavelength division multiplexed optical communication signal and for optically amplifying the east-west wavelength division multiplexed optical communication signal, the bidirectional optical amplifier comprising:

a first optical circulator having first, second, third, and fourth circulator ports, the first port of the first optical circulator optically communicating with the optical transmission path to receive the west-east wavelength division multiplexed optical communication signal;

a second optical circulator having first, second, third, and fourth circulator ports, the first port of the second optical circulator optically communicating with the optical transmission path to receive the east-west wavelength division multiplexed optical communication signal;

a first set of one or more Bragg gratings configured to reflect optical wavelengths within the west-east wavelength division multiplexed optical communication signal optically communicating with the second port of the first optical circulator;

a second set of one or more Bragg gratings configured to reflect optical wavelengths within the east-west wavelength division multiplexed optical communication signal optically communicating with the second port of the second optical circulator;

a first gain block optically communicating with the third port of the first optical circulator and with the fourth port of the second optical circulator;

a second gain block optically communicating with the third port of the second optical circulator and with the fourth port of the first optical circulator; and first and second receiving systems optically communicating with the optical transmission path for respectively receiving the west-east and east-west wavelength division multiplexed optical communication signals.

6. A bidirectional wavelength division multiplexed optical communication system as recited in claim 5 wherein the first and second gain blocks comprise optically-pumped rare-earth-doped optical fibers.

7. A bidirectional wavelength division multiplexed optical communication system as recited in claim 6 wherein the rare-earth doped optical fibers include erbium.

8. A bidirectional wavelength division multiplexed optical communication system as recited in claim 5 wherein the first and second receiving systems include wavelength selectors comprising one or more Bragg gratings for selecting individual optical channels.

9. A bidirectional wavelength division multiplexed optical communication system as recited in claim 5 wherein the first and second sets of Bragg gratings comprise chirped gratings.

10. A bidirectional optical amplifier for optically amplifying nominally west-east wavelength division multiplexed optical communication signals and for optically amplifying nominally east-west wavelength division multiplexed optical communication signals in a bidirectional wavelength division multiplexed optical communication system comprising:

a first optical circulator having first, second, third, and fourth circulator ports, the first port of the first optical circulator configured to receive a west-east wavelength division multiplexed optical communication signal;

a second optical circulator having first, second, third, and fourth circulator ports, the first port of the second optical circulator configured to receive an east-west wavelength division multiplexed optical communication signal;

a first set of one or more Bragg gratings configured to reflect optical wavelengths within a west-east wavelength division multiplexed optical communication signal optically communicating with the second port of the first optical circulator;

a second set of one or more Bragg gratings configured to reflect optical wavelengths within an east-west wavelength division multiplexed optical communication signal optically communicating with the second port of the second optical circulator;

a first gain block optically communicating with the third port of the first optical circulator and with the fourth port of the second optical circulator; and a second gain block optically communicating with the third port of the second optical circulator and with the fourth port of the first optical circulator.

11. A bidirectional optical amplifier as recited in claim 10 wherein the first and second gain blocks comprise optically-pumped rare-earth-doped optical fibers.

12. A bidirectional optical amplifier as recited in claim 11 wherein the rare-earth doped optical fibers include erbium.

13. A bidirectional optical amplifier as recited in claim 10 wherein the first and second sets of Bragg gratings comprise chirped gratings.

* * * * *